Sept. 24, 1940.  L. A. HERZIG  2,215,468
SOUND RECORDING AND REPRODUCING APPARATUS
Filed April 24, 1937  9 Sheets-Sheet 1

INVENTOR.
LEONARD A. HERZIG
BY Sager & Malcolm
ATTORNEYS.

Sept. 24, 1940.  L. A. HERZIG  2,215,468
SOUND RECORDING AND REPRODUCING APPARATUS
Filed April 24, 1937   9 Sheets-Sheet 2
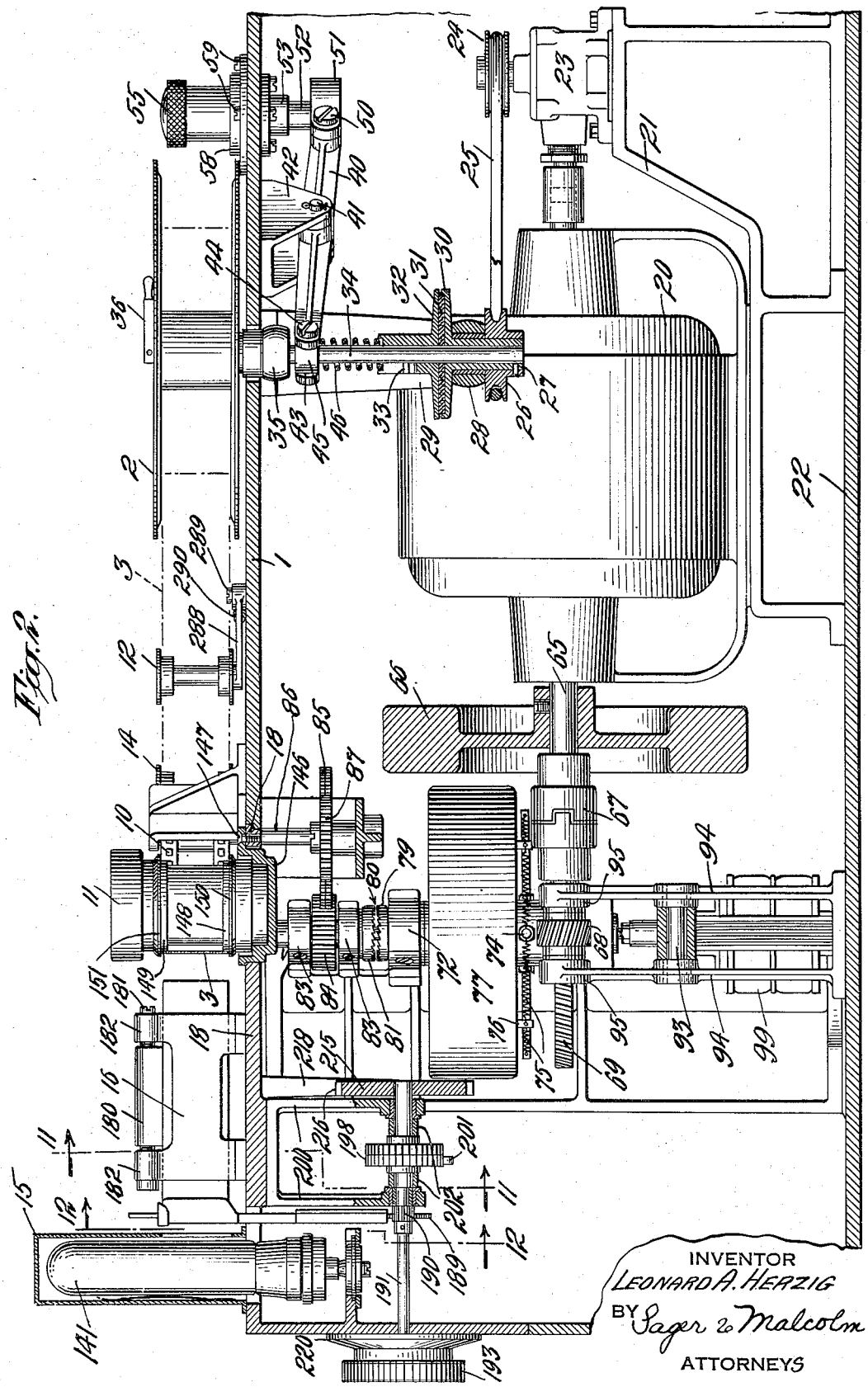
INVENTOR
LEONARD A. HERZIG
BY Sager & Malcolm
ATTORNEYS

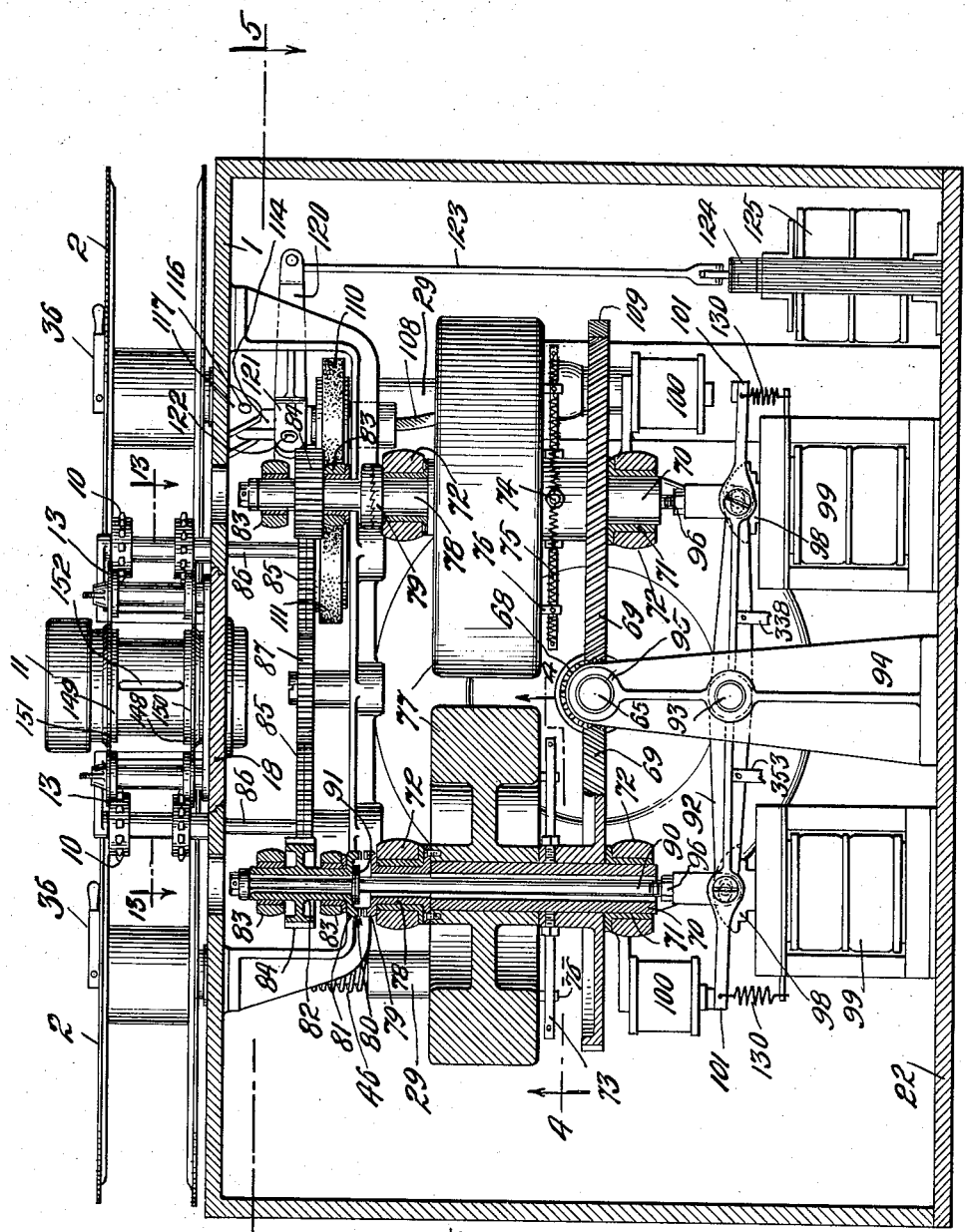

Sept. 24, 1940.　　　　L. A. HERZIG　　　　2,215,468
SOUND RECORDING AND REPRODUCING APPARATUS
Filed April 24, 1937　　　9 Sheets-Sheet 4

INVENTOR
LEONARD A. HERZIG
BY Sager & Malcolm
ATTORNEYS

Sept. 24, 1940.  L. A. HERZIG  2,215,468
SOUND RECORDING AND REPRODUCING APPARATUS
Filed April 24, 1937  9 Sheets-Sheet 5
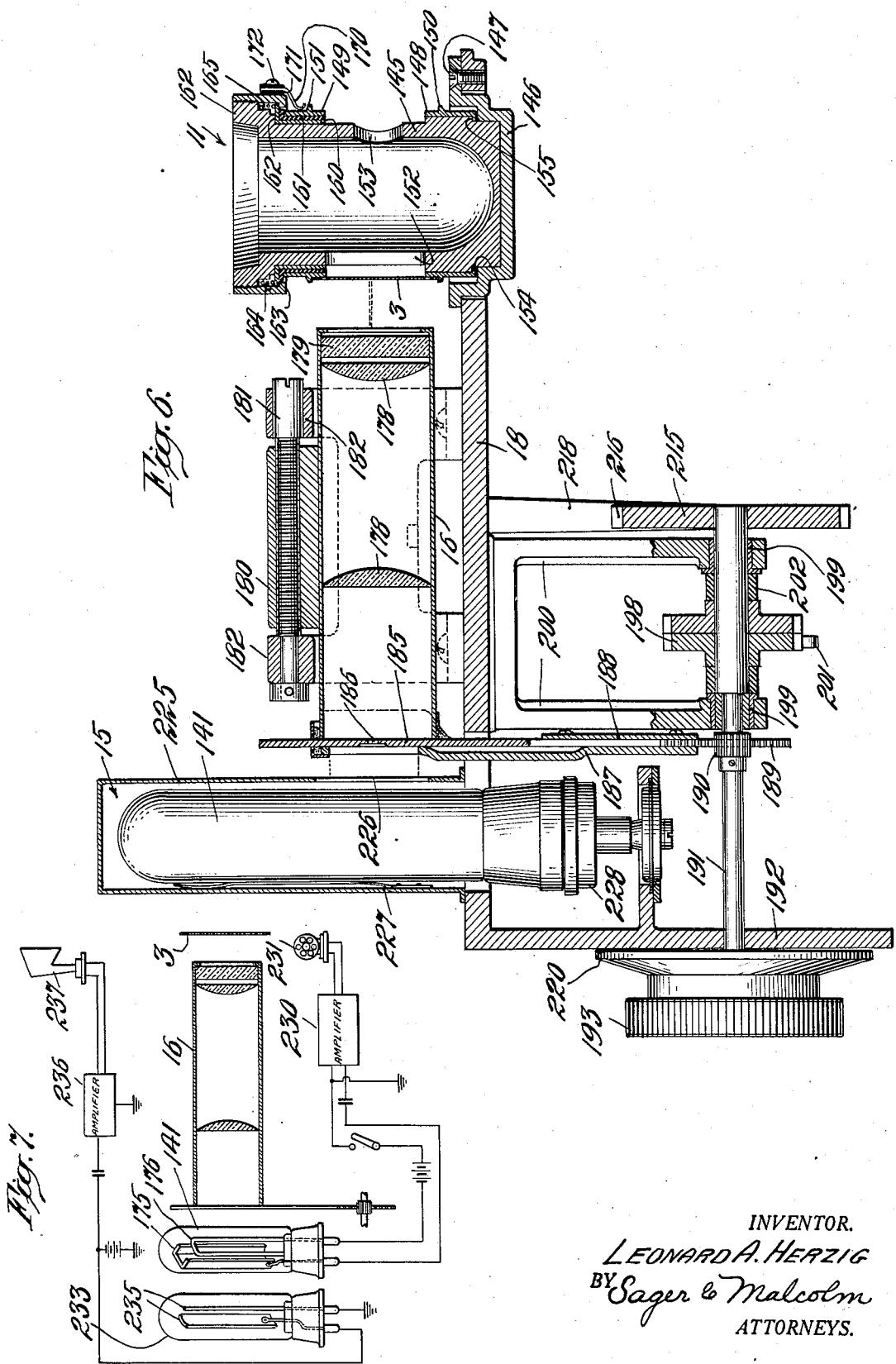
INVENTOR.
LEONARD A. HERZIG
BY Sager & Malcolm
ATTORNEYS.

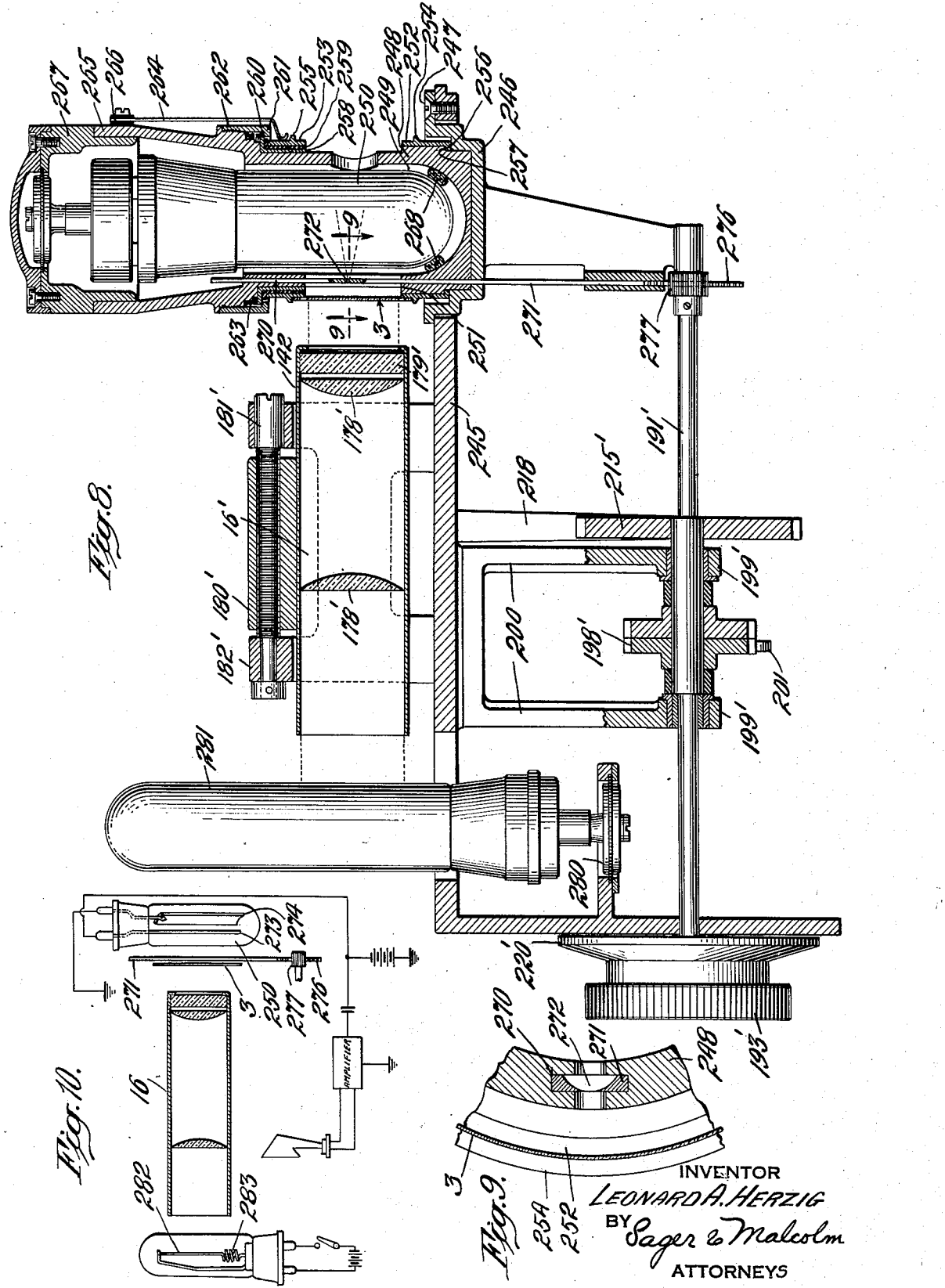

Sept. 24, 1940. L. A. HERZIG 2,215,468
SOUND RECORDING AND REPRODUCING APPARATUS
Filed April 24, 1937 9 Sheets-Sheet 7
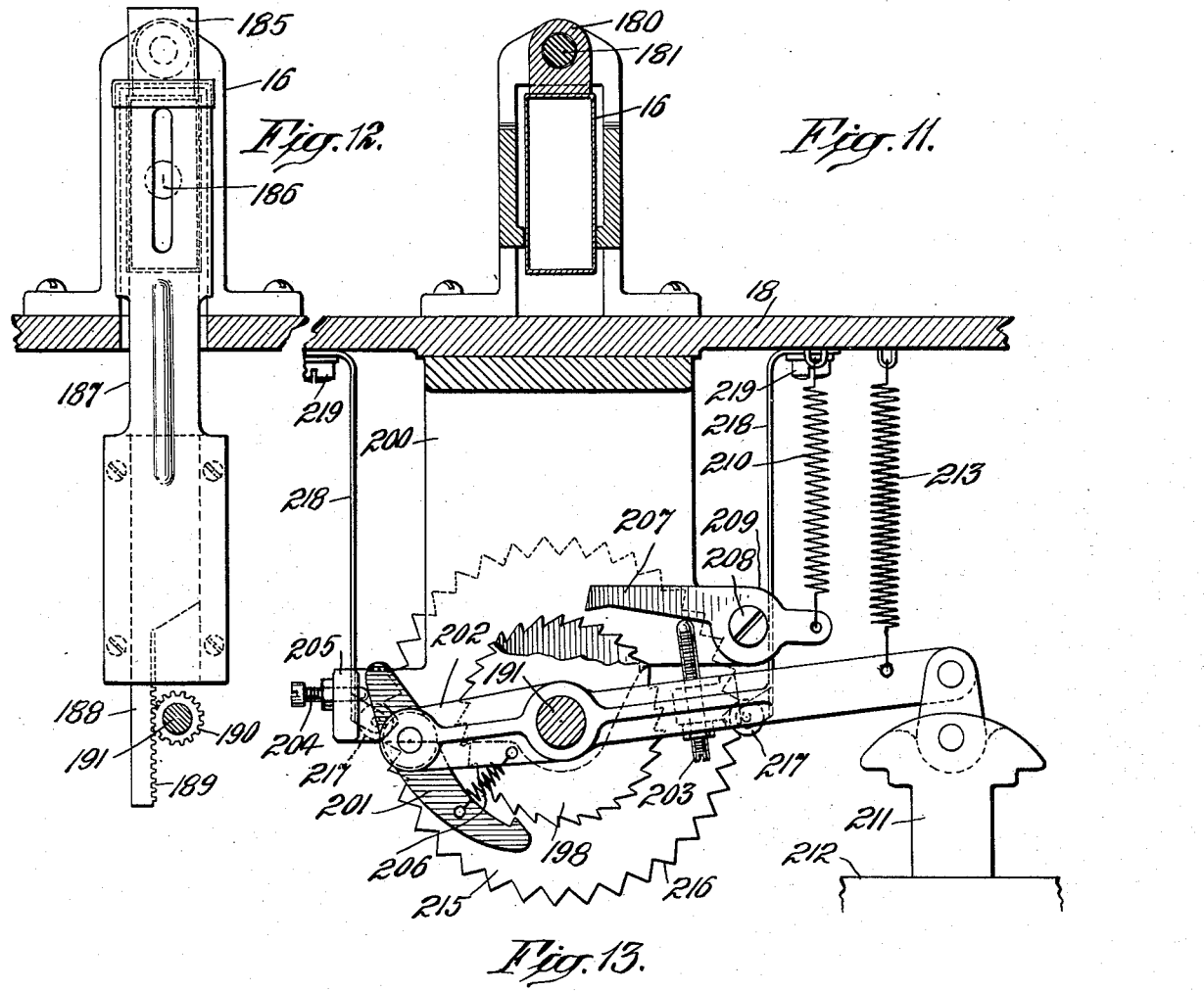
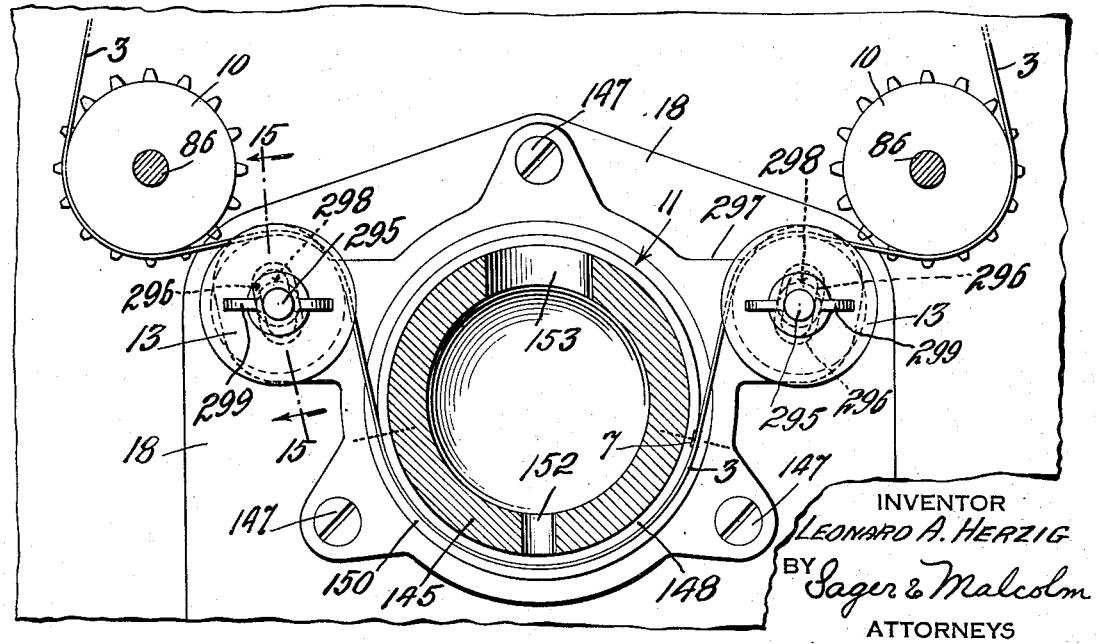
INVENTOR
LEONARD A. HERZIG
BY Sager & Malcolm
ATTORNEYS Sept. 24, 1940. L. A. HERZIG 2,215,468
SOUND RECORDING AND REPRODUCING APPARATUS
Filed April 24, 1937 9 Sheets-Sheet 8
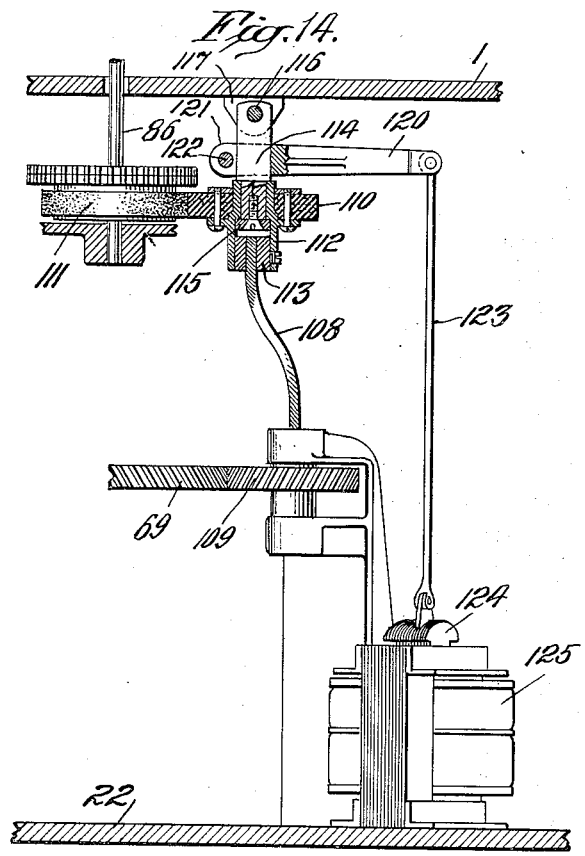
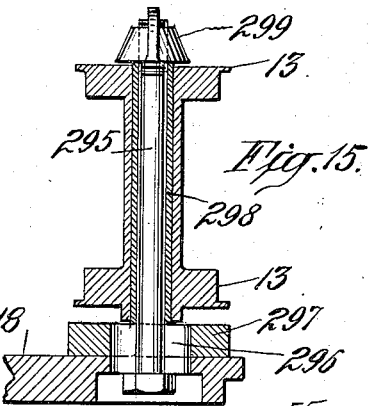
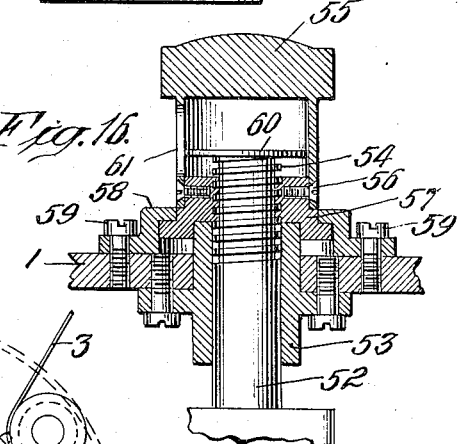
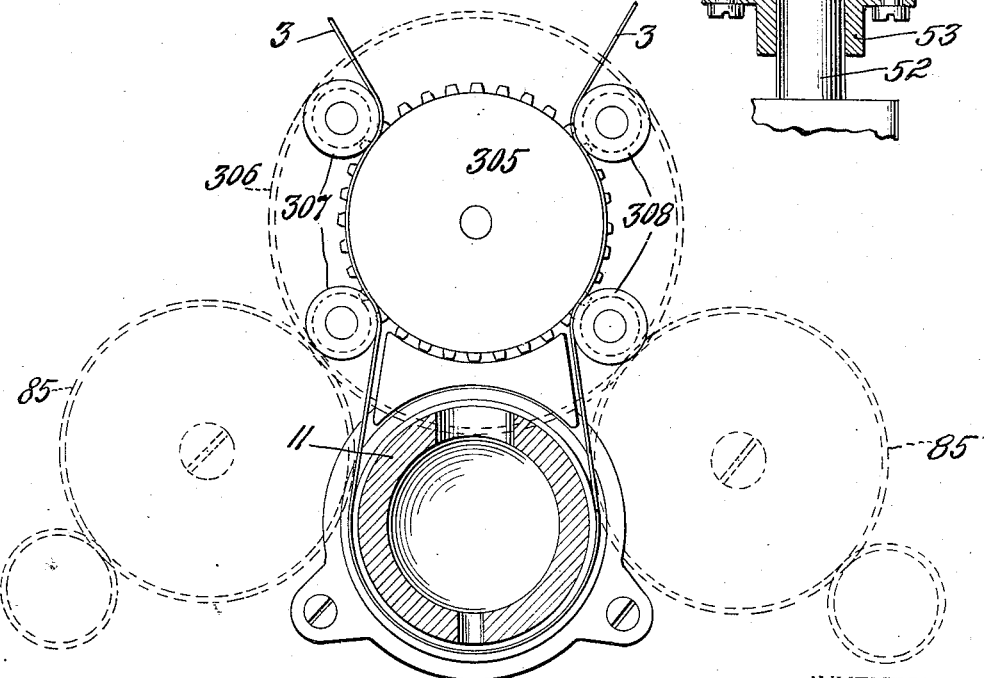
INVENTOR
LEONARD A. HERZIG
BY Sager & Malcolm
ATTORNEYS Sept. 24, 1940.   L. A. HERZIG   2,215,468
SOUND RECORDING AND REPRODUCING APPARATUS
Filed April 24, 1937   9 Sheets-Sheet 9
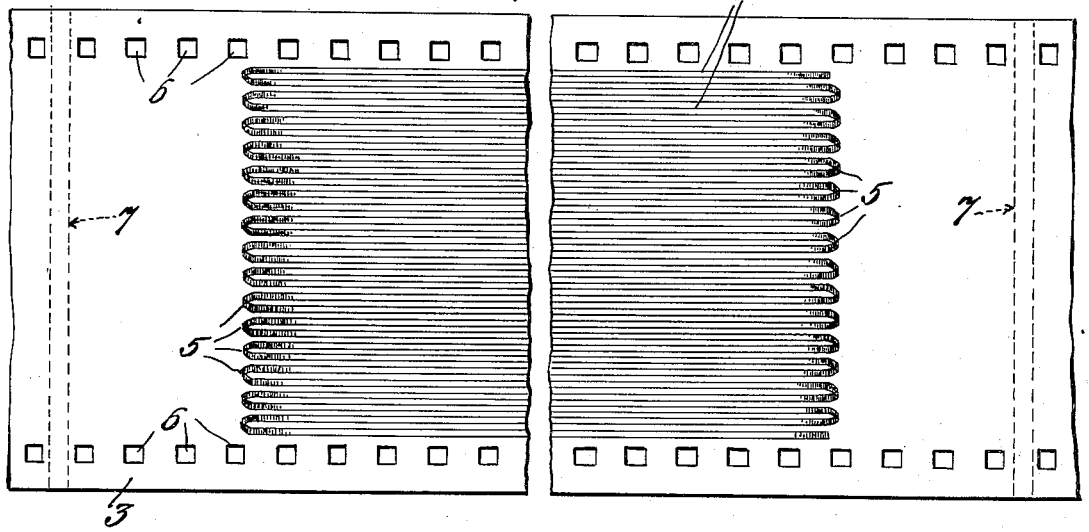
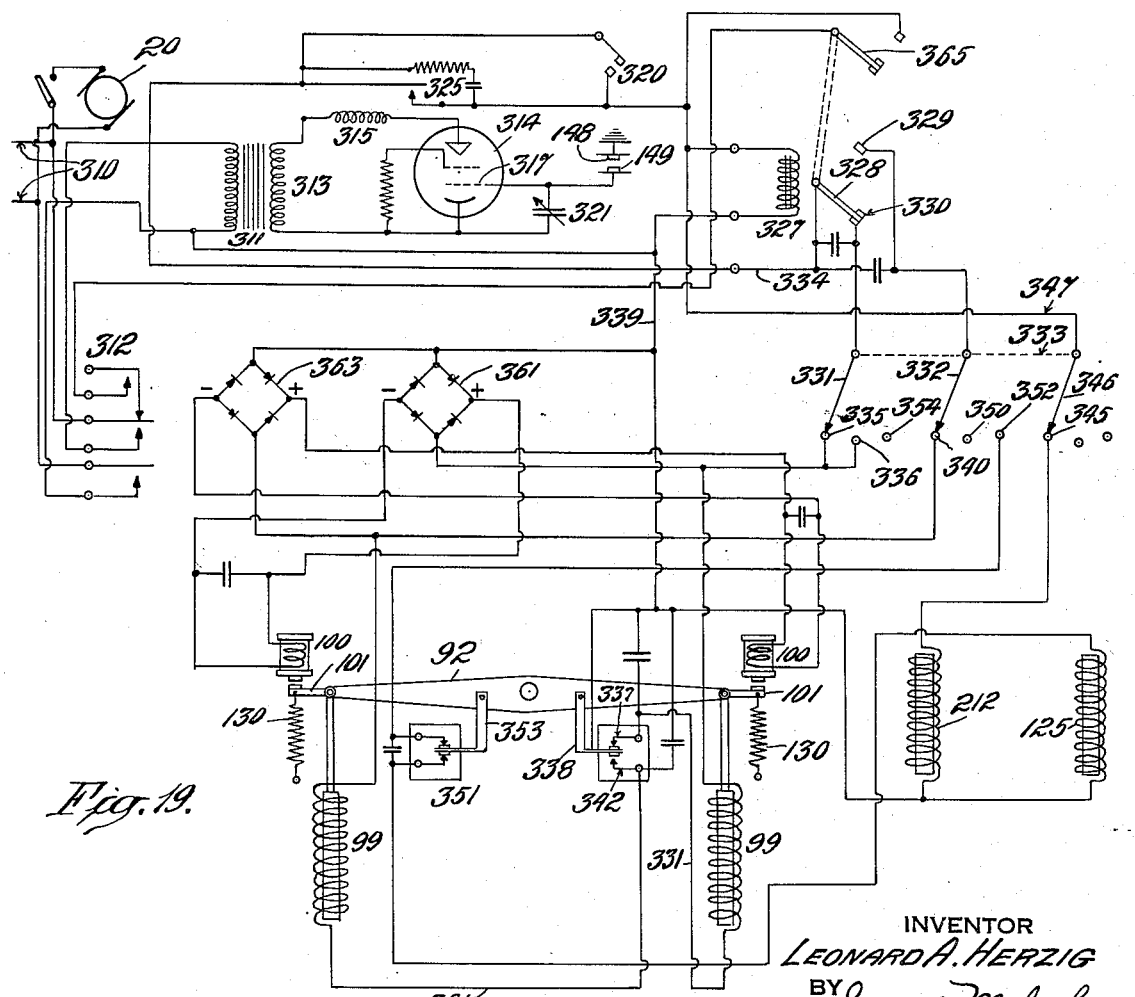
INVENTOR
LEONARD A. HERZIG
BY Sager & Malcolm
ATTORNEYS Patented Sept. 24, 1940

2,215,468

UNITED STATES PATENT OFFICE 2,215,468

SOUND RECORDING AND REPRODUCING APPARATUS

Leonard A. Herzig, Brooklyn N. Y., assignor, by mesne assignments, to Lon-Ga-Tone, Inc., New York, N. Y., a corporation of New York Application April 24, 1937, Serial No. 138,751

37 Claims. (Cl. 179—100.3)

This invention relates to a photographic sound recording and reproducing system and has for its object to provide a new and improved apparatus for continuously and uninterruptedly recording on or reproducing from a plurality of parallel sound tracks or for playing any selected part or track of the completed record.

Other objects of the invention are: to provide a new and improved photographic sound record; to provide a record in the form of a film having a plurality of parallel sound record tracks thereon which are adapted to be played successively without audible break or extraneous sound during the change-over from track to track; to provide a record of the foregoing type in which the successive tracks are played by moving the film first in one direction and then in the reverse direction, and are joined to each other by uniform loops forming parts of the sound tracks; and to provide a record of this type in which the loops connecting the sound tracks are exactly positioned and are all aligned in the same transverse section of the film.

Further objects of the invention are to provide a device of the above type having automatic reversing and step-up mechanisms to cause the scanning beam to follow the loops of the sound track during the change-over from track to track; to provide an improved, highly sensitive reversing mechanism actuated by the film itself; to provide an apparatus of the above type having readily interchangeable recording and reproducing heads; to provide a novel and improved control for the scanning light; to provide a novel and improved system for shifting the beam without moving the lens assembly; to provide a novel and improved light source and lens system; to provide novel and improved driving and reversing mechanisms; to provide a high-speed rewind for use in returning the film to starting position after playing individual selections or sections of the sound record; and in general to improve the details of construction and mode of operation of the parts in an apparatus of the type referred to above.

The invention is particularly applicable to apparatus for recording or reproducing sound for broadcasting purposes, for assemblies, for record libraries or for other purposes for which phonographs or film have heretofore been used. An important feature of the invention resides in the use of a comparatively short film containing a plurality of sound tracks which are played successively. A standard width 35 mm. film may, for example, have some thirty different sound tracks which are joined by loops so arranged that the scanning light follows the loops on the change-over without audible variation. The film is held on two reels and is fed first in one direction and then in the other for scanning each of the different connected tracks which constitute the sound record.

In one embodiment of the invention the film is fed past a sound gate by a pair of sprockets which are reversibly driven in unison. A pair of driveshafts preferably having suitable vibration dampeners are continuously driven in opposite directions and an electrically operated clutch mechanism is provided to selectively connect the sprockets in driving relationship to the respective driveshafts. This mechanism is automatically operated by the film itself whenever the end of a sound track has been reached, or it may be operated manually. In the preferred form of the invention hereinafter described a sensitive and accurate control of the reversing mechanism is obtained by changing the grid potential of a space discharge tube by the capacity effect of a conducting bar or strip which is formed in or attached to the film adjacent the ends of the sound tracks; the control being effected when the conducting strip reaches a predetermined point with respect to the sound gate.

Another feature of the invention resides in providing a scanning light and lens system for both recording and reproducing purposes, which supplies light of uniform intensity over the entire width of the film, and in shifting only the aperture plate transversely of the film to position the light beam for scanning the successive tracks of the film. In the recording head the aperture plate is preferably located between the light source and the lens system, while in the reproducing head the aperture plate is preferably located between the film and the photoelectric cell. In either case the plate may be stepped from one position to the next by a mechanism which operates in synchronism with the reversing mechanism.

Another feature resides in the provision of a rewind mechanism for rewinding the film at a higher speed when single sound tracks or groups of tracks are to be used for individual selections. In one embodiment a manual switch is provided for stopping the film and for rewinding. The rewind is stopped automatically, however, when the conducting strip on the film reaches the designated point on the film gate. Means are also provided to prevent the rewind mechanism from operating except when the main drive clutches are released. In the form shown herein for purposes of illustration the rewind is effected by a friction wheel driven by a flexible driveshaft and brought into driving position by a rewind solenoid.

Another feature of the invention resides in the provision of an adjustable friction drive for the take-up mechanism which may be adjusted in accordance with the length of the film so that more power is supplied to operate the heavier reels when longer films are used. This adjustment is controlled by a dial which may be suitably graduated to read in feet of film.

Still another feature resides in the provision of a manual adjustment for the aperture plate which may be graduated to indicate the particular sound track being scanned. This adjustment permits any sound track to be selected from a multiple track film and is useful, for example, if different selections are recorded on the different tracks.

These and many other features and advantages of the invention will be described in connection with the accompanying drawings, in which:

Fig. 2 is a vertical section taken on line 2—2 of Fig. 1;

Fig. 3 is a transverse section taken on line 3—3 of Fig. 1, showing the driving, reversing and rewinding mechanisms;

Fig. 4 is a detail section on line 4—4 of Fig. 3, showing the mechanical filter;

Fig. 6 is an enlarged longitudinal section of the recording unit shown in Fig. 1;

Fig. 7 is an electrical diagram of the recording unit shown in Fig. 6;

Fig. 8 is a view similar to Fig. 6, but showing the reproducing unit adapted to be used interchangeably with the recording unit of Fig. 6;

Fig. 9 is a detail section taken on line 9—9 of Fig. 8;

Fig. 10 is a circuit diagram of the reproducing unit shown in Fig. 8;

Fig. 11 is a sectional view taken on line 11—11 of Fig. 2, showing details of the mechanism for controlling the position of the aperture plate;

Fig. 12 is another sectional view of said control mechanism, taken on line 12—12 of Fig. 2;

Fig. 13 is a horizontal section taken on line 13—13 of Fig. 3, illustrating the sound gate and the threading and adjusting mechanism for the film;

Fig. 14 is a vertical section on line 14—14 of Fig. 5, showing the rewind mechanism;

Fig. 15 is a detail section on line 15—15 of Fig. 13, illustrating the parallel adjustment of the film guiding rollers;

Fig. 16 is vertical section on line 16—16 of Fig. 1, showing the mechanism for adjusting the tension of the take-up mechanism;

Fig. 17 is a view similar to Fig. 13, showing a modification of the film driving mechanism;

Fig. 18 is a plan view of a strip of film, showing the electric contacts at both ends for controlling the reversal of the film; and Fig. 19 is a diagram of the electrical circuits of the apparatus.

Figure 1:
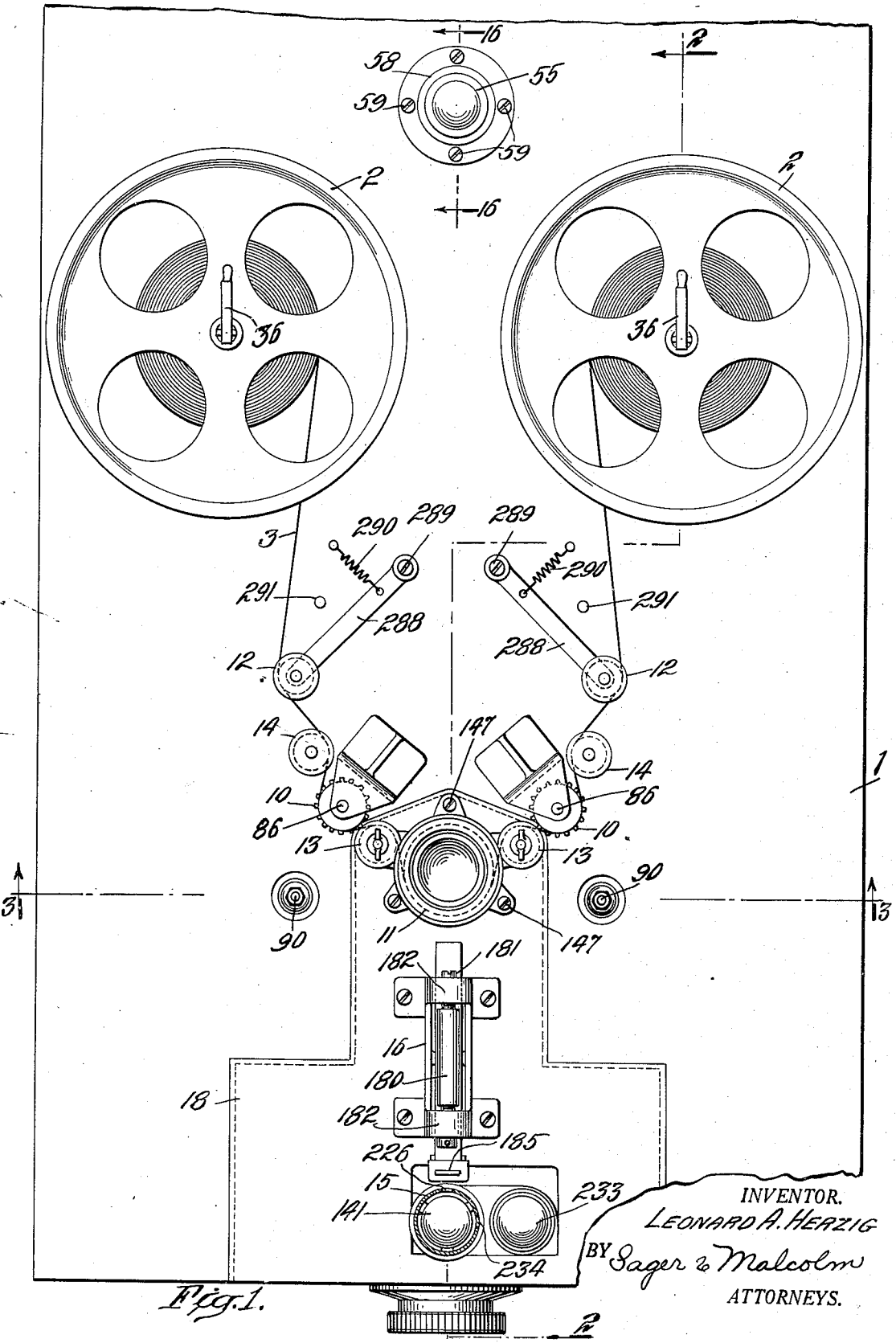
Fig. 1 is a top plan view of my preferred apparatus as adapted for recording purposes.

In the following description and in the claims certain specific terms are used for convenience in referring to various details of construction, but it will be understood that these terms are to be given as broad an interpretation as the state of the art will permit.

The machine shown in the drawings comprises a top plate 1 (Figs. 1 to 3) on which are mounted a pair of reels 2 carrying the film 3 which contains the sound record. This film may be of the usual type employed in motion pictures and is shown more in detail in Fig. 18 as having a plurality of parallel sound record tracks 4 which extend over substantially the entire length of the film and are joined at their ends by loops 5. The successive tracks are recorded with the film moving in opposite directions so that a continuous sound record is obtained by following the tracks in succession and reversing the film as the end of each track is reached. The film has the usual perforations 6 which cooperate with suitable teeth on the drive sprockets and is provided adjacent its two ends, at predetermined points with respect to the loops 5, with strips 7 of conducting material which may be sprayed or painted on the film or may be formed separately and attached thereto in any convenient way.

The conducting strips 7 are used for automatically reversing the film 3 in a manner hereinafter described. It is to be understood that the film itself may be of any suitable or standard construction. The sound tracks 4, however, are all of exactly the same length and the loops 5 are aligned in the same transverse section of the film so that the scanning ray can be caused to exactly follow these loops on each reversal of the film. This exactness in the position of the various loops is obtained by the control mechanism hereinafter described.

Referring again to Figs. 1 to 3, the film 3 is passed between the reels 2 over a pair of drive or feed sprockets 10 and over a film gate 11. Suitable spring-pressed guide rollers 12 or equivalent means are provided to take up the slack of the film and to absorb the shock of reversal as hereinafter described. Idler rollers 13 and 14 are provided for suitably guiding the film with respect to the feed sprockets 10 and the film gate 11.

The film gate 11 supports the film in a position to be scanned by light from a light source 15 which is focussed by a telescope or lens system 16 onto the film. The film gate 11, adjustable idler rollers 13, light source 15, telescope 16 and associated mechanisms are mounted as a unit on a panel 18 which is adapted to be removed from the top plate 1 and to be replaced by a reproducing unit when the machine is used for reproducing sound from the film.

*Take-up mechanism*

Figure 5:
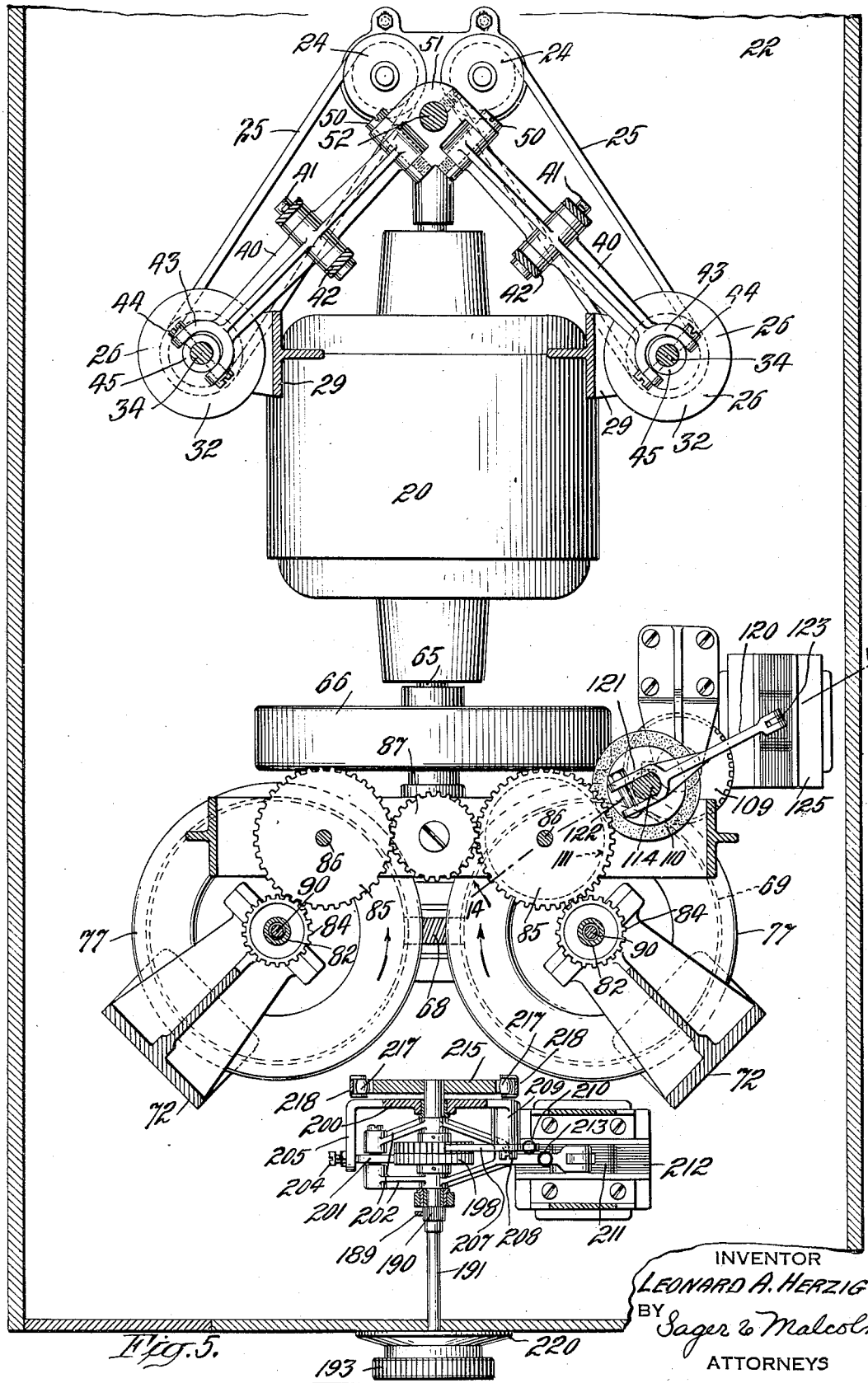
Fig. 5 is a horizontal section through the apparatus, taken on line 5—5 of Fig. 3.

The take-up mechanism for driving the reels 2 is shown in detail in Figs. 2 and 5 and includes a motor 20 which is mounted on suitable brackets 21 supported on the base 22 of the machine. The motor 20, through a reduction gear 23, drives pulleys 24 in opposite directions. These pulleys carry belts 25 which drive the pulleys 26. Each pulley 26 is mounted on a sleeve 27 which is rotatably held in a bearing 28 supported by a bracket 29 which is attached to the top plate 1 of the machine. Each sleeve 27 carries a disk 30 on which a friction disk 31 of suitable friction material is supported as shown in Fig. 2. Engaging this friction disk 31 is a driven disk 32 which is keyed, as by key 33, to a shaft 34 which extends through the sleeve 27 and is rotatable therein. The shaft 34 extends through a bearing 35 which is formed on the bracket 29 and supports a reel 2. The reel is locked to shaft 34 for rotation therewith by means of a lever 36 which is adapted to fold over onto the top of the reel for the above purpose.

For varying the amount of friction I provide a pair of pivoted arms 40 which are pivoted at 41 to ears 42 carried on the top plate 1 of the machine. Each arm 40 is provided at one end with a fork 43 carrying adjustable pins 44 which seat in a rotating collar 45. A spring 46 is seated around the shaft 34 between the collar 45 and the driven disk 32 to apply pressure to said disk dependent upon the amount of compression of said spring. The other ends of the arms 40 are connected by pins 50 to a collar 51 which is carried on shaft 52 extending through a bushing 53 attached to the top plate 1 of the machine. The shaft 52 is provided at its ends with threads 54 as shown in Fig. 16. An adjusing knob 55 is attached by screws 56 to a threaded collar 57 which is in threaded engagement with the shaft 52. The collar 57 is journaled between the bushing 53 and an annular member 58 which is rigidly attached to the top plate 1 by screws 59. The arrangement is such that rotation of the adjusting knob 55 causes the shaft 52 to be threaded upwardly or downwardly through the bushing 53 and thereby cause pivotal movement of the arms 40 for varying the pressure of the springs 46.

In the above-described take-up mechanism each lower disk 30 is driven by a belt 25 from a pulley 24 which in turn is driven by the motor 20. The lower disk 30 drives the upper disk 32 by the friction obtained by the pressure of the spring 46. The disk 32, being keyed to the shaft 34, drives the shaft and the reel 2 which is attached thereto. If desired, an index may be provided by mounting a disk 60 at the end of the shaft 52 within the knob 55 and visible through a slot 61 in said knob as shown in Fig. 16. The disk accordingly moves axially and, by its position, indicates the adjustment of the springs 46. A suitable scale may be provided on the knob 55 to register with the disk 60 for the foregoing purpose.

It has been found that the driving force required for the reels 2 depends upon the weight of the reels, more force being required for driving a heavy reel than for a light reel. This weight is proportional to the length of the film, consequently the adjusting knob 55 may be graduated directly in feet of film so that an operator, knowing the feet of film on any given reel, can adjust the pressure of the spring 46 accordingly. It is to be understood that the take-up mechanism operates to supply sufficient force to the reel to maintain the film in a tight condition while it is being driven by the feed sprockets 10 so as to feed the same from one reel to the other.

Drive for feed sprockets

Feed sprockets 10 are driven from the motor 20 by means of a driveshaft 65 attached to the motor, (Figs. 2, 3 and 5) and carrying a flywheel 66 by which irregularities in the drive are largely eliminated and hunting of the motor is prevented. The shaft 65 is connected by a flexible coupling 67 to a helical gear 68 which drives a pair of helical gears 69 at the same speed and in opposite directions. The gears 69 are rotatably mounted on sleeves 70 which are journaled in bearings 71 carried on brackets 72 which are attached to the top plate 1 and the base 22 of the machine in a convenient manner. The gears 69 each carry a spider 73 having a plurality of arms 74 (as shown in Fig. 4) which are connected by springs 75 to pins 76 which are formed on or attached to flywheels 77. The flywheels 77 are attached to the sleeves 70 and are each attached to a sleeve 78 which is part of the lower tooth element 79 of a one-way clutch 80. The upper tooth element 81 of this clutch 80 is part of sleeve 82 which is journaled in bearings 83 carried by the bracket 72. Each sleeve 82 carries a gear 84 meshing with a gear 85 which is attached to the shaft 86 on which the drive sprocket 10 is fixed. The two gears 85 are preferably split gears of any suitable type designed to eliminate backlash or play; and these gears are connected by an idler gear 87 so as to operate in unison and at a uniform speed.

For operating the clutch member 80 there is provided a rod 90 which extends through each sleeve 70 and is provided with a collar 91 which is positioned below the upper tooth element 81 of the clutch 80 and is adapted when elevated to raise the upper tooth element sufficiently to disengage the tooth from the lower element 79. The rods 90 are connected to a pivoted arm 92 which is pivoted at 93 between the arms of a double bracket 94 supported on the base 22 as shown in Fig. 3. The bracket 94 also provides bearings 95 in which the driveshaft 65 is journaled as shown in Fig. 2.

The ends of the arm 92 are attached to cores 98 of solenoids 99 which are arranged to control the position of the arm 92. The arrangement is such that when one of the solenoids 99 is energized the core 98 and the rod 90 attached thereto are pulled downwardly, thereby causing the corresponding clutch 80 to engage while disengaging the opposite clutch. The direction of drive of the sprockets 10 is accordingly dependent upon the particular solenoid 99 which is energized at any particular time. The motor 20 and the flywheels 77 are rotated continuously. When one of the clutches is displaced, however, the corresponding driveshaft picks up and drives the sprocket 10. The springs 75 provide a loose coupling between the respective flywheel 77 and the associated gear 69 so that each spider forms a mechanical filter or vibration dampener to eliminate minor vibrations or variations in the drive from being applied to and effecting the uniform rotation of the feed sprockets 10. By interconnecting the driveshaft for the two feed sprockets 10 by means of the gear 87 any play or lost motion is prevented and the gears are caused to operate in exact unison. The reversal may be effected substantially instantaneously when one of the solenoids is energized. The lock nuts 96 on rods 90 hold these rods in position and permit vertical adjustment of the upper halves of the associated clutches 80.

In order to maintain the clutch 80 engaged after the rod 90 has been moved downwardly by energization of the solenoid 99 and without requiring the solenoid to be continuously energized, a suitable holding means may be provided. In the embodiment shown, this holding means may comprise electromagnets 100 which are suitably mounted on the frame of the machine and cooperate with armatures 101 carried by the pivoted arm 92 as shown in Figs. 3 and 19. The operation of electromagnets 100 will be described later.

High speed rewind mechanism

In certain instances it is desirable to rewind the reel at a higher rate of speed, as for example when the various film tracks are used for independent selections or programs. In that event when one selection has been completed it may be desired to rewind the film preliminary to playing a second selection. This may be accomplished by providing a high speed rewind, one form of which is shown in Figs. 3 and 14. In the embodiment shown the rewind comprises a flexible driveshaft 108 which is driven by a gear 109 meshing with one of the helical gears 69. The flexible driveshaft 108 is attached in driving relationship to a friction disk 110 which is adapted to be brought into driving engagement with a second friction disk 111 which is mounted on the shaft 86 of the corresponding feed sprocket 10 which is normally driven by the gear 69 from which the power is taken. The friction disk 110 is mounted on a housing 112 which is attached by a block 113 to the flexible driveshaft 108 and is mounted for rotation on a shaft 114 by means of a collar 115. The shaft 114 is pivoted at 116 to ears 117 attached to the top plate 1 of the machine. The pivotal position of the shaft 114 is determined by an arm 120 having a forked end 121 which is adapted to be clamped by a screw 122 about the arm 114 and at its other end is attached to a rod 123 which engages the core 124 of a solenoid 125. The arrangement of the above parts is such that when the solenoid 125 is energized the core 124 and the rod 123 are pulled downwardly thereby pivoting the arm 120 and the shaft 114 and causing the friction disk 110 to bear against and drive the friction disk 111. When the solenoid 125 is deenergized, the disk 110 is brought out of engagement with the disk 111 by the resilience of the flexible drive 108 or by any other suitable means not shown.

For holding the arm 92 in neutral position with both clutches 80 disengaged, when the machine is to be stopped or when the high speed rewind mechanism is to be used, two springs 130 balance the arm 92 as shown in Fig. 3.

*Recording head*

The recording head is mounted as a unit on the panel 18 as shown in detail in Fig. 6. This recording head carries an elongated glow lamp 141 comprising the light source, a telescope tube 16 and the film gate 11 together with associated mechanisms hereinafter described. The film gate 11 comprises a circular housing 145 mounted in a cup 146 which is attached to the panel 18 by suitable means such as screws 147. A pair of rotating rings 148 and 149 are mounted on the housing 145. These rings are provided with shoulders 150 and 151 respectively, between which the film 3 is seated. The housing 145 is also provided with opposite apertures 152 and 153 which are aligned with the scanning ray hereinafter described. The aperture 152 permits the focus of the light ray on the film to be properly adjusted, while aperture 153 permits visual inspection of the focussing operation. In the form shown the lower ring 148 is mounted for rotation directly on the housing 145 and is provided with a lip 154 which is seated between the shoulder 155 formed in the housing 145 and the surface of the cup 146. The lip 154 serves to prevent axial motion of the ring 148.

The upper ring 149 is shown as insulated from the housing 145 for a reason to be described. For this purpose the upper ring is attached to an inner rotating ring 160 from which it is separated by a ring 161 of insulating material. The ring 160 is mounted for rotation on the upper part of the housing 145 and is provided with a flange 162 which bears against and is confined by a flange 163 formed on a locking ring 164 which is attached to the housing 145. A helical spring 165 is seated in a suitable recess in the housing 145 and bears against the top of the flange 162 to prevent axial movement of the ring 149. The flange 163 is spaced from the ring 149 so as to avoid making electrical contact therewith. The ring 149 is thus insulated by the ring 161 from the housing 145. For making an electrical contact with this ring a spring brush 170 is provided which bears against the surface of the ring 149 and is attached to the locking ring 164 by means of an insulating bushing 171. An electrical connection may be made to this brush 170 which is fastened to the ring 164 by screw 172. It will be noted that the film 3 is supported on the rings 148 and 149 as it passes over the housing 145 constituting the film gate 11 and is thereby held in proper position to receive the scanning ray.

The glow lamp 141 is preferably formed with elongated electrodes 175 and 176 as shown in Fig. 7. These electrodes are made substantially longer than the area of the film 3 which is to be scanned so that light may be focussed over the entire width of the film with substantially equal intensity. In the form shown the electrode 175 is channel-shaped and constitutes the cathode, whereas the electrode 176 is in the form of a looped wire registering with the edges of the channel-shaped electrode 175 and constitutes the anode. This elongated construction permits a uniform light intensity to be radiated from a substantial portion of the glow lamp. This light is focussed by a suitable lens system carried by the telescope tube 16 over the entire width of the film 3. In the form shown the telescope tube 16 carries a pair of cylindrical lenses 178 the axes of which extend in a direction transverse to lens 179 and are arranged so as to concentrate the rays received from the glow lamp 141 over an area extending the full width of the film 3. This light is concentrated and focussed in a narrow vertical band by means of the cylindrical lens 179 which is arranged with its axis extending in a vertical direction. The arrangement is such that this band which constitutes the scanning ray is preferably not over .0003" in width. The telescope tube 16 may be provided with a lug 180 which is adjustably supported on a screw 181 which is held in bracket 182 attached to the panel 18. Adjustment of the screw 181 moves the telescope tube and the entire lens system axially so as to permit proper focussing of the light rays from the glow lamp 141.

In order to confine the ray to one sound track of the film at a time an aperture plate 185 is provided between the glow lamp 141 and the telescope tube 16. This aperture plate is formed with a narrow slit 186 corresponding in width to the width of one of the sound tracks as indicated in Figs. 6 and 12 and is mounted for sliding vertical movement in a shield 187 which is carried by the telescope tube 16. The aperture plate 185 is provided with a downwardly extending portion 188 carrying rack 189 which meshes with a gear 190. The gear 190 is adjustably fastened to a shaft 191 which extends through the front wall 192 of panel 18 and carries a knob 193 by means of which the position of the aperture plate 185 may be adjusted. It will be noted that the gear 190 is sufficiently long to permit slight axial movement of the rack 189 as the aperture plate 185 and telescope tube 16 are adjusted for focussing the light in the manner described above.

For shifting the aperture plate 185 between successive film tracks a pawl and ratchet mechanism is provided which comprises a ratchet gear 198 (Figs. 6 and 11) carried on the shaft 191 and held between bearings 199 of said shaft which are carried in bracket 200 attached to the panel 18. A pawl 201 is pivoted to a split arm 202 which is journaled on the shaft 191 on opposite sides of the ratchet gear 198 as shown in Figs. 5 and 11. The pawl 201 rests against an adjustable stop 204 (Fig. 11) which is carried by an arm 205 (Fig. 5) attached to the bracket 200. The pawl 201 is normally held out of engagement with ratchet gear 198 by a spring 206. A locking pawl 207 is pivoted as at 208 on an arm 209 attached to the bracket 200 and is moved toward the ratchet wheel 198 by a spring 210. Adjustable stop 203 is carried by the arm 202 to engage the locking pawl 207 and hold the same out of contact with the teeth of the ratchet wheel 198 when the wheel is not actuated. The arm 202 is attached to core 211 of a solenoid 212 which is adapted when energized to cause the pivotal movement of the arm 202 for stepping the ratchet wheel 198 around one tooth. Suitable means, such as a spring 213, may be provided for returning the arm 202 to the position shown in Fig. 11 when the solenoid is deenergized.

For holding the ratchet wheel 198 in a given position a disk 215 (Figs. 6 and 11) is mounted on the shaft 191 and is provided with a plurality of peripheral teeth 216 against which rollers 217 rest. These rollers are carried on leaf springs 218 which are attached to the panel 18 by means of screws 219. The rollers 217 are adapted to engage the disk 215 between the teeth 216 so as to secure the ratchet mechanism in any adjusted position. It is to be noted that when the solenoid 212 is deenergized the arm 202 is in the position shown in Fig. 11 and the pawls 201 and 207 are held out of engagement with the ratchet wheel 198 by the stops 204 and 203, respectively. The shaft 191 may then be rotated by means of knob 193. This knob is preferably provided with graduations 220 which register with a suitable index on the front 192 of panel 18 to indicate the position of the aperture 186. This index may, for example, be numbered to indicate the number of the sound track which is in position to be played or recorded. This hand adjustment may be used, for example, when it is desired to set the machine to record on a given sound track. The dial likewise turns with the shaft 191 during the automatic operation of the machine and thereby indicates the position of the scanning ray at any particular time.

It is to be understood that the entire ratchet mechanism including the solenoid 212 may be removable as a unit with the panel 18. Suitable quick detachable plugs, not shown, may be provided for breaking the electrical circuit when the recording head is thus removed.

As shown in Fig. 6, a shield 225 having an aperture 226 in alignment with the telescope tube 16 may be positioned over the glow lamp 141 to prevent light rays from going any place except through the apertures 226 and 234, the latter of which is used for monitoring purposes as shown in Fig. 1 and as described below. This shield may have suitable spring clips 227 by which it is securely seated over the glow lamp.

The glow lamp may be provided with a suitable vibration dampening socket 228 by which it is connected to a supply circuit in the usual manner.

The glow lamp is actuated as indicated in Fig. 7 by the output circuit of an amplifier 230 which is fed in the usual manner by a microphone 231 or by any other suitable pickup means. In order to assist in listening in, a photoelectric cell 233 is mounted on the panel 18 as indicated in Fig. 1 in a position to be energized directly by the glow lamp 141. The shield 225 is provided with a slit 234 opposite the photoelectric cell 233 as shown in Fig. 1 so as to permit rays from the glow lamp to pass therethrough. The photoelectric cell 233 is preferably made with elongated elements 235 which extend in an axial direction substantially coextensible with the elongated elements 175 and 176 of the glow lamp 141. This photoelectric cell 233 may be connected with the input circuit of a standard amplifier 236 the output circuit of which may be connected to a suitable reproducing device 237, such as a loud speaker, earphones or the like. It will be evident that the photoelectric cell could be mounted in other positions; for example, it could be mounted in back or or within the film gate 11 in which case it would receive only the scanning ray which has passed through the film.

It is to be understood that the optical system within the telescope tube 16 may be varied as desired. In general the optical system should be designed to focus the light in the form of a fine vertical band equal to the entire width of the film so that the aperture plate in moving vertically can cut off all of the light except that corresponding to the selected sound track. In this way it is only necessary to move the aperture plate in shifting from one sound track to another. The remainder of the mechanism remains stationary. In the embodiment shown an upward movement of the aperture plate will cause a downward movement of the scanning ray at the film and vice versa. The lens system, however, could be arranged to produce parallel rays in which case the movement of the aperture would correspond to the movement of the scanning ray at the film.

In the above-described mechanism the scanning rays may be shifted from one sound track to the next with great rapidity inasmuch as it is only necessary to move the comparatively light weight aperture plate. The movement can also be accurately controlled by the automatic timing mechanism, hereinafter described, so as to synchronize exactly with the reversal of the film at the end of each sound track.

*Reproducing head*

The machine is so constructed that the reproducing head shown in Fig. 8 is interchangeable with the recording head shown in Fig. 6. The reproducing head comprises a panel 245 which is adapted to seat on and be secured to the top plate of the machine in place of the panel 18 as shown in Fig. 1. This panel 245 carries a cup 246 which is attached thereto by suitable screws 247 and supports a housing 248 which forms the film gate. The housing 248 is provided with a cylindrical bore 249 in which the photoelectric cell 250 is adapted to be positioned. It is also provided with an opening 251 which extends over substantially the entire width of the film so that the rays from the various sound tracks can pass to the photoelectric cell.

The film is supported upon a pair of rotating rings 252 and 253 which are similar in construction to the rings 148 and 149 described above in connection with Fig. 6. These rings are provided with flanges 254 and 255 between which the film 3 is guided. The ring 252 is rotatably mounted on the housing 248 and is provided with a flange 256 which engages beneath a shoulder 257 in said housing for positioning the ring.

The ring 253 is mounted on a ring 258 from which it is separated by an insulating ring 259. The ring 258 is rotatably mounted on the housing 248 and is provided with a flange 260 which is engaged by the flange 261 formed on a locking ring 262. The spring 263 is employed to keep the film guide flange 255 in constant contact with the upper edge of the film 3 during operation even though wear should take place. The flange 261 terminates short of the ring 253 so that this ring is electrically insulated from the housing. Contact is made to the ring 253 by means of a flexible brush 264 which is attached to an extension 265 of the housing and is insulated therefrom by bushing 266. The extension 265 carries a cap 267 which closes the top of the housing and forms a socket for making the electrical connection to the photoelectric cell 250. The socket may be of any convenient or standard construction for this purpose. Suitable spacing elements 268 of soft material such as rubber may be provided at the bottom of the housing 248 and within the central bore 249 so as to support the photoelectric cell 250 and to prevent vibration from being imparted thereto.

The housing 248 is also provided with a vertical bore 270 in which an aperture plate 271 slides. The aperture plate is provided with an aperture 272 of a suitable dimension to pass light only from one sound track of the film at a time. The photoelectric cell is formed with a pair of elongated electrodes 273 and 274, as indicated in Fig. 10, so that the effect of the scanning ray on the film is unchanged as the ray moves across the film.

The aperture plate 271 carries on its lower end a rack 276 which engages the gear 277 held on the shaft 191'. The shaft 191' corresponds to shaft 191 shown in Fig. 6 and carries similar ratchet mechanism which has been given corresponding reference numerals with primes affixed thereto, and the description of these parts will accordingly not be repeated. It is to be understood that the entire ratchet mechanism of Fig. 11, including the arm 202, the solenoid 212 and associated parts is duplicated in the reproducing head of Fig. 8 and this reproducing head is removable as a unit to replace the corresponding mechanism in the recording head.

The reproducing head is also provided with a socket 280 in which exciting lamp 281 is held. This exciting lamp is provided with an elongated filament 282 as shown in Fig. 10, which is of such length that rays of equal intensity are propagated over the entire apertured area of the telescope tube to be described. This filament 282 may be held in position by a spring 283 which is adapted to maintain the filament tight under all conditions. This is important inasmuch as the image of the filament is to be focussed onto the film and any variations thereof would cause corresponding distortion in the reproduction.

The reproducing head is provided with a telescope tube 16' which is similar in construction to the telescope tube 16 of Fig. 6 and carries a suitable lens system. The elements of the tube and the lens have accordingly been given the same reference characters with primes affixed thereto and a description thereof will not be repeated.

The lenses in general are adapted to focus an image of the elongated filament 282 on the film 3 as the film passes the opening 251 in the housing 248. The image must be of equal intensity across the entire width of the film inasmuch as it is to cooperate with the various sound tracks thereon. The aperture plate 271 cuts off all of the rays passing through the film except the rays through the selected sound track which are permitted to pass through the aperture 272 and to be impressed upon the photoelectric cell 250. As the aperture plate is stepped upwardly or downwardly by means of the ratchet mechanism the scanning ray is thus shifted from one sound track to the next in a manner similar to that described in connection with the aperture plate 185 of Fig. 6. In the reproducing head, however, the scanning rays are continuously applied to the entire film width and the aperture plate is positioned between the film and the photoelectric cell. It is to be understood that the aperture plate could be placed in some other position if desired. For example, the aperture plate could be located between the exciting lamp 281 and the telescope tube as shown in Fig. 6, or it could be located between the telescope tube and the film 3.

Guide rollers

Referring to Fig. 1, it is noted that the spring-pressed guide rollers 12 are provided for absorbing the shock on the film during reversal. Each of these guide rollers is shown as mounted on an arm 288 which is pivoted by means of a screw 289 and is held by a spring 290 in contact with the film 3. Stop 291 may be used to limit the movement of these arms. The adjustment of the spring tension should be such that the rollers 12 are adapted to take up the shock when the film is reversed and prevent tearing of the film. It is to be noted in this connection that when the film is reversed one of the reels 2 will be full and correspondingly heavy and will be rotating in a direction to wind up the film thereon. When the film is suddenly reversed by reversal of the sprockets 10 the inertia of this full reel must be overcome and the reel started to rotate in the opposite direction against the drag exerted by the take-up mechanism. The pressure of the springs 290 is adjusted so as to accomplish this, the arms 288 swinging inwardly as the film tightens, and these arms are returned by the springs 290 when reversal occurs in the direction of the reel for taking up. It is to be understood that suitable adjustment may be provided for varying the pressure of the springs 290 if desired.

Idler rollers 14 are mounted in the usual manner to hold the film in contact with the drive sprockets 10. Idler rollers 13 are mounted between the feed sprockets 10 and the film gate in which these idler rollers are attached to hold the film in contact with the feed sprockets and also to maintain the film in engagement with a predetermined sector of the aperture plate as shown more in detail in Fig. 13. In Fig. 13 idler rollers 13 are shown mounted so that they may be adjusted to compensate for variations in length of the film due to temperature changes, etc., the mounting being arranged so that this adjustment can be effected without changing the arc of contact of the film with the film gate. This latter feature is of importance inasmuch as the reversal of the film is automatically effected when the conducting strip 7 thereon engages the film gate; consequently any variation in the arc of contact would alter the timing of the control mechanism. In the embodiment shown this adjustment is obtained by mounting each idler roller 13 upon a shaft 295 (Figs. 13 and 15) which is held in an elongated slot 296 in a plate 297 attached to the panel 18 in the case of the recording head, or to the panel 245 in the case of the reproducing head. A bushing 298 is disposed about the shaft 295 and is adapted to be clamped against the plate 297 by means of a thumb screw 299. The roller 13 is mounted for free rotation on this bushing 298.

The slot 296 is elongated in a direction parallel to the line of feed of the film toward the film gate, that is, in a direction parallel to a tangent to the film gate at the point where the conducting strip 7 on the film comes into contact with the film gate as shown in Fig. 13. Consequently adjustment of the idler roller 13 along this slot 296 does not change the angle of the feed of the film past the sound gate and does not change the timing of the control mechanism. It is to be understood, of course, that other suitable adjusting means may be used if desired in place of that shown and described above.

Film drive of Fig. 17

Fig. 17 shows a modified form of film drive which may be used in place of the two feed sprockets 10. In this embodiment the film gate 11 is constructed in the manner described above.

In place of the two feed sprockets 10, however, there is provided a single feed sprocket 305 which is of sufficient diameter so that the film may contact over two separate portions of the surface thereof. This sprocket 305 is driven by gear 306 which meshes with the gears 85 as shown in Fig. 17. The film 3 passes in driving engagement with a portion of the surface of the feed sprocket 305 with which it is held in contact by adjustable rollers 307. Thence the film passes around the film gate 11 and in driving engagement with another portion of the sprocket 305 with which it is held in contact by adjustable rollers 308. The rollers 307 and 308 are mounted so that they can be displaced to permit the film to be threaded over the sprocket 305. In this embodiment the film is driven to and from the film gate by means of a single sprocket. This construction may be preferred in certain instances as for example in a light machine where it is desired to reduce the number of parts as much as possible. It is understood that the machine is otherwise similar to that described above.

Control circuit

The control for reversing the drive and for stepping the aperture plate from one sound track to the next is shown in Fig. 19. This circuit shows an AC supply line 310 driving the motor 20 and feeding the primary of the transformer 311 through a switch 312 by which the entire system may be disconnected as desired. The secondary 313 of transformer 311 is connected across the anode and cathode of a space discharge tube 314 of standard construction such as a grid glow tube. A relay 315 is connected in series with one of the leads from the secondary 313 to the tube 314 in such a way that the space current of the tube passes through relay 315 and energizes the same. The tube 314 is provided with a grid 317 which is adjustably connected to the cathode of the tube through an impedance such as a variable condenser 321. The biasing potential on the grid 317 may be adjusted by condenser 321 to a value sufficiently negative to block the tube. When the capacity hereinafter described is added to the grid circuit, however, the potential of the grid is altered sufficiently to permit passage of space current through the tube. For this purpose the grid 317 is connected to an insulated ring 149 of the recording head or the insulated ring 253 of the reproducing head by means of the respective contact brushes 170 and 264.

The bottom ring 148 of the recording head or the bottom ring 252 of the reproducing head is grounded to the unit. Consequently when the metallic strip 7 of the film engages these rings the effect is to add capacity to the grid circuit thereby changing the grid biasing potential and permitting space current to flow. This space current energizes relay 315 which thereupon attracts its armature and closes its contact 325, completing the circuit from one side of the supply line 310 through an impulse relay 327 and back to the other side of the supply line. The relay 327 is thus connected across the line and is energized thereby. The relay 327 is of the impulse type which is adapted to move its armature 328 alternately to close contact 329 or 330 at successive actuations of the relay.

A switch such as a push button 320 may be connected in parallel to the contact points 325 of relay 315 by which the electrical circuit may be manually operated to actuate the relays when desired. The contacts 329 and 330 are connected respectively to blades 332 and 331 of a triple-pole triple-throw switch 333. The armature 328 is connected by a line 334 to one side of the supply line. Contacts 335 and 336 of switch 333, which cooperate with the blade 331, are connected together and to one of the solenoids 99 as well as to a suitable rectifier such as a rectox unit 361 which is connected to a holding electromagnet 100. In the embodiment shown these contacts are connected to the right hand solenoid 99. The circuit of this solenoid is completed through a contact 337 engaging an arm 338 carried on the arm 92. The arm 338 is connected by a lead 339 to the opposite side of the supply line. The left hand contact 340 for the blade 332 is connected to both a rectox unit 363 which supplies the holding electromagnet 100 on the left side of the arm 92, as well as to the left hand solenoid 99 and thence through lead 341 to a lower contact 342 which is adapted to be engaged by the arm 338 when the arm 92 has been depressed by actuation of the right hand solenoid 99. When starting the machine the arm 92 is in a neutral position due to the balancing springs 130, which allows the clutches to remain in neutral position. The motor 20 is then started and allowed to come up to speed. Thereafter the switch 312 is closed to energize the control circuit.

The switch 312 has a make, break, and then make circuit whereby in the event that the arm 328 of impulse relay 327 is not closing contact 330 an impulse will be transmitted through contact arm 365 and impulse relay 327 causing arm 328 to close contact 330 for starting purposes. This safety factor insures that arm 328 will always be in the correct position for moving the film in the one direction at starting time. The arm 328 is now making contact with contact 330 as shown in Fig. 19. The grid glow tube 314 is normally blocked and does not pass current. The relay 315 is, therefore, deenergized and is only energized when the conducting strip 7 of the film makes contact with the above-mentioned rings of the film gate, whereupon the potential on grid 317 of tube 314 is altered thereby allowing space current to pass. This space current passing through relay 315 energizes the same and causes the relay to close contact 325 thereby completing the circuit through and energizing the impulse relay 327 to shift the arm 328, thereby opening contact 330 and closing contact 329.

The contact 329 supplies current through blade 332 and contact 340 of switch 333 to the rectox unit 363, which I shall refer to as a holding current, and also to the left-hand solenoid 99, the circuit to which is completed through contact 342 and arm 338. Energization of the left-hand solenoid 99 pulls the left end of arm 92 downward, thereby reversing the drive of the machine in the manner described in connection with Figs. 3 to 5 and at the same time opening contact 342 and closing contact 337. The left-hand solenoid 99 is accordingly energized only momentarily and is deenergized as soon as it has been actuated to shift the arm 92. However, holding current supplied through rectox unit 363 is supplied to the associated electromagnet 100 as shown in Fig. 19.

The film is now running in the reverse direction, and, when it has again reached the end of its travel so that the opposite conducting strip 7 contacts with the above-mentioned rings on the film gate, a circuit is again completed which energizes relay 315 and thereby again energizes impulse relay 327. This energization of relay 327 opens contact 329 and closes contact 330, thereby completing the circuit through blade 331 of switch 333 to the rectox unit 361 as well as to the right-hand solenoid 99, contact 337 now being closed. This energization of the right-hand solenoid 99 again actuates arm 92, reversing the position thereof and reversing the direction of drive in the manner described above. It will be noted, therefore, that each successive engagement of the conducting strips 7 with the rings of the film gate causes reversal of the drive. In order to actuate the ratchet mechanism in synchronism with the reversal of drive, the solenoid 212 of Fig. 11 is connected to one side of the supply line by lead 339 and thence by contact 345 to the third blade 346 of switch 333 which is connected by lead 347 to contact 325 of relay 315. Each energization of relay 315 which closes contact 325 accordingly completes the circuit through solenoid 212 and causes the ratchet mechanism to step the aperture plate to its next position. The shifting of the aperture plate on the reversal of drive is accordingly accurately synchronized so that, in recording, the successive sound tracks are joined by uniform loops as shown in Fig. 18, and, in reproducing, the scanning ray follows the path of these loops as it is shifted from one sound track to the next. In this way any break in the sound is avoided. The reversing and shifting of the aperture plate takes place so rapidly that not more than one cycle of sound energy is lost and this is not sufficient to produce any audible effect in the reproduced sound.

In some instances the sound tracks, instead of being continuous as described above, may be arranged so that a plurality of selections or programs are incorporated on the same film. A different selection may, for example, be recorded on each sound track. In this event the tracks may all be recorded in the same direction and when the selection has been completely played it is necessary to stop the machine and rewind the film prior to the playing of the next selection. By means of the connections shown in Fig. 19 the film may be stopped for the above purpose by shifting the triple-pole switch 333 so that blades 331 and 332 engage the second contacts. The second contact 350 is not connected to any electric circuit. Therefore, when arm 328 engages contact 329 no electrical circuit is made through blade 332, hence rocker arm 92 is moved to a neutral position by means of springs 130 causing the clutch mechanisms to disengage and bringing the film to a dead stop. However, in the event the record referred to above is a short record and manual operation is desired to stop this record from running to the end of the film, push button 320 may be used to energize impulse relay 327 so that the above-mentioned circuit is opened. It is to be noted that contact 337 is closed while the arm 92 is in neutral position and when the right end of arm 92 is in elevated position. The machine can thus be alternately started and stopped by button 320.

In order to actuate the high speed rewind, the rewind solenoid 125 is connected from one side of the line to lead 339 through a switch 351 to a third contact 352 adapted to engage the blade 332 of switch 333. After the machine has been stopped in the manner described above, switch 333 is shifted to a third position to close contact 352 thereby completing the circuit from contact 329 through blade 332, contact 352 and switch 351, to the solenoid 125, thus causing the rewind mechanism shown in Fig. 14 to be actuated for rewinding the film. The switch 351 is associated with an arm 353 which is carried by arm 92 and is adapted to open the circuit whenever arm 92 is out of neutral position, thereby preventing accidental operation of the rewind mechanism when either of the clutches is engaged.

In order to automatically stop the machine when the film has been rewound, the conducting strip 7 actuates the relay mechanism as described above, thereby opening the electrical circuit so that no current can pass to any solenoid, and allowing the balancing springs 130 to bring arm 92 to neutral position. If switch 333 is then returned to its second position the arm 331 closes contact 336 thereby energizing the right hand solenoid 99 and causing the machine to again operate. The machine will then operate until another impulse closes contact 329 of impulse relay 327 which then opens the electrical circuit through blade 332, allowing arm 92 to again be neutralized by springs 130.

Summarizing the above, it is noted that with switch 333 in the position shown in Fig. 19 the machine is automatically reversed at each end of the sound track by contact strip 7 and is adapted to continuously play the entire sound track. With switch 333 in the second position the machine is alternately operated in one direction by energization of the right-hand solenoid 99 when contact 330 is closed, or is stopped by deenergizing the circuit when contact 329 is closed allowing neutralizing springs 130 to neutralize rocker arm 92. With switch 333 in the third position the high speed rewind mechanism is operated when contact 329 is closed to complete a circuit through solenoid 125 and the machine is stopped when contact 330 is closed to deenergize the circuit allowing springs 130 to again neutralize rocker arm 92.

It is evident, therefore, that any desired combination of manual and automatic control can be obtained by the above-described system. It is further to be understood that only so much of the circuit has been set forth as is necessary to an understanding of the invention. Various condensers are connected across the relay contacts in the usual manner to prevent sparking. Other control and adjusting features may be incorporated therein in a manner understood in the art.

Operation

The operation of the various elements has been described above. It is to be noted that the machine as a whole is intended to operate with a multiple track film for continuously playing the entire sound record or for selectively playing certain individual sound record tracks. The machine is adapted to be used either for recording or reproducing by the simple expedient of providing separate and interchangeable recording and reproducing heads, both of which are mounted as a unit and may be removed from the machine with a minimum amount of labor and time. The film is fed from one reel, over the drive sprockets and film gate and onto the opposite reel. The drive sprockets 10 are actuated in unison by the driving mechanism shown in Figs. 2 to 5, the direction of drive being controlled by the position of arm 92 which actuates the clutches 80. With arm 92 in neutral position the machine is stopped. With arm 92 tilted either upwardly or downwardly the film is fed in a direction dependent upon the particular clutch which is engaged thereby.

It is to be noted that the light source, telescope tube and associated parts are stationary, the aperture plate being moved to shift the position of the scanning ray. The aperture plate is moved by the ratchet mechanism shown in Figs. 6, 8, 11 and 12 so as to shift the scanning ray from one sound track to another at each actuation thereof. This ratchet mechanism is controlled by a solenoid which is connected in parallel to the solenoid controlling the reversal of feed, consequently exact synchronism is assured.

While the film gate is shown as having rotating rings it is obvious that stationary rings could be used if desired, in which case one of the rings would be insulated from the machine and the other grounded thereto so that a circuit would be completed by contact strips 7 for actuating the control mechanism whenever these strips engage the appropriate part of the sound gate. It is also evident that the sound gate may be of other construction and shape. A round gate has been shown for convenience inasmuch as it is adapted to receive the photoelectric cell and also to serve as a guide for the film. In some instances it may be desirable to omit part of the housing in which case the photoelectric cell can be mounted in back of the film gate. The details of construction and mounting of the telescope tube and the lens system may also be varied as desired. In Fig. 6 a particular mechanical connection has been shown for permitting the aperture plate to be shifted with the telescope tube while maintaining driving engagement with gear 190, but it is evident that any other suitable driving connection which permits of this relative adjustment may be employed.

Although certain details of construction and combination of parts have been specifically shown and described for purposes of illustrating the invention it is to be understood that various changes and modifications may be made therein as will be apparent to a person skilled in the art. The invention is therefore to be limited only in accordance with the following claims when interpreted in view of the prior art.

The invention claimed is:

1. In a photographic sound record apparatus for recording on or reproducing from a film having spaced parallel sound tracks thereon forming a continuous record, a light source, means for focussing light from said source with equal intensity across the entire record area of said film, an aperture plate having a single aperture arranged to pass to said film only the rays which register with a single sound track, and means to shift said aperture plate transversely of said film for causing said trays to progressively register with successive sound tracks, said rays being unobstructed during the shift period whereby a continuous uninterrupted sound record is obtained.

2. In a photographic sound record apparatus for recording on or reproducing from a film having spaced parallel sound tracks thereon forming a continuous record, a film gate, means to feed a film thereover at a uniform speed, a light source, a lens system focussing light from said source with equal intensity across the entire record area of the film on said film gate, means supporting said film gate, light source and lens system in fixed position, an aperture plate having a single aperture arranged to pass to said film only the rays which register with a single sound track, and means to shift said aperture plate transversely of said film for causing said rays to progressively register with successive sound tracks, said rays being unobstructed during the shift period whereby a continuous uninterrupted sound record is obtained.

3. In a photographic sound record apparatus for recording on or reproducing from a film having a plurality of spaced parallel sound tracks thereon, a light source having an elongated light emitting area at least as long as the entire width of the record area of said film, a lens system focussing the light from said source with equal intensity across said entire record area of said film, an aperture plate having a single aperture arranged to pass only the rays which register with a single sound track, and means to shift said aperture plate transversely of said film for causing the rays to progressively register with successive sound tracks, said rays being unobstructed during the shift period whereby a continuous uninterrupted sound record is obtained.

4. In a photographic sound record apparatus for recording sound on a plurality of parallel sound record tracks on a film forming a continuous record, a light source, a lens system focussing light from said source with equal intensity across the entire record area of said film, an aperture plate between said source and said film having a single aperture to pass only the rays which register with a single sound track, and means to shift said aperture plate transversely of said film for causing said rays to progressively register with successive sound tracks, said rays being unobstructed during the shift period whereby a continuous uninterrupted sound record is obtained.

5. In a photographic sound record apparatus for recording sound on a plurality of parallel sound record tracks on a film, a light source having an elongated light emitting area at least as long as the entire width of the record area of said film, a lens system focussing light from said source with equal intensity across the entire record area of said film, an aperture plate between said source and said film having a single aperture to pass only the rays which register with a single sound track, and means to shift said aperture plate transversely of said film for causing said rays to progressively register with successive sound tracks, said rays being unobstructed during the shift period whereby a continuous uninterrupted sound record is obtained.

6. In a photographic sound record apparatus for reproducing sound from a film having a plurality of spaced parallel sound tracks thereon forming a continuous record, a light source, a lens system focussing light from said source with equal intensity across the entire record area of said film, a photoelectric cell positioned to receive said rays after passage through said film, an aperture plate having a single aperture to pass only the rays which register with a single sound track, and means to shift said aperture plate transversely of said film for causing said rays to progressively register with successive sound tracks, said rays being unobstructed during the shift period whereby a continuous uninterrupted sound record is obtained.

7. In a photographic sound record apparatus for reproducing sound from a film having a plurality of spaced parallel sound tracks thereon forming a continuous record, a light source, a lens system focussing light from said source with equal intensity across the entire record area of said film, a photoelectric cell positioned to receive said rays after passage through said film, an aperture plate between said film and said photoelectric cell having a single aperture to pass rays from a single sound track only, and means to shift said aperture plate transversely of said film for causing said aperture to progressively register with successive sound tracks, said rays being unobstructed during the shift period whereby a continuous uninterrupted sound record obtained.

8. In a photographic sound record apparatus for reproducing sound from a film having a plurality of spaced parallel sound tracks thereon, a light source having an elongated light-emitting element at least as long as the entire width of the record area of said film, a lens system focussing light from said source in a narrow band across said record area, a photoelectric cell to receive said light after passage through said film, an aperture plate having a single aperture arranged to pass only the rays which register with a single sound track, and means to shift said aperture plate transversely of said film for progressively scanning successive sound tracks, said rays being unobstructed during the shift period whereby a continuous uninterrupted sound record is obtained.

9. In a photographic sound record apparatus for reproducing sound from a film having a plurality of spaced parallel sound tracks thereon forming a continuous record, a film gate comprising a housing adapted to receive a photoelectric cell, means to feed a film over said gate at a uniform speed, a light source, a lens system focussing light from said source with equal intensity across the entire record area of the film on said gate, an aperture plate slidably mounted in said housing, said aperture plate having a single aperture adapted to pass only the rays from a single sound track, and means to shift said aperture plate transversely of said film for progressively scanning successive sound tracks, said rays being unobstructed during the shift period whereby a continuous uninterrupted sound record is obtained.

10. In a photographic sound record apparatus for recording on or reproducing sound from a film having a plurality of spaced parallel sound tracks thereon, a light source and a photoelectric cell mounted on opposite sides of said film, said light source having elongated elements at least as long as the entire width of the record area of said film, a lens system focussing light from said source across said record area, an aperture plate having a single aperture passing only rays which register with a single sound track, and means to shift said aperture plate transversely of said film for progressively scanning successive sound tracks, said rays being unobstructed during the shift period whereby a continuous uninterrupted sound record is obtained.

11. In a photographic sound record apparatus for recording a plurality of spaced parallel sound tracks on a film, a light source, a telescope tube carrying a lens system focussing light from said source with equal intensity across the entire record area of said film, an aperture plate slidably mounted on said telescope tube and having an aperture to pass only the rays which register with a single sound track, means to shift said aperture plate transversely of said film for progressively scanning successive sound tracks, and means to axially adjust said telescope tube and said aperture plate in unison for adjusting the focus of said rays on said film.

12. In a photographic sound record apparatus for recording on or reproducing from a film having a plurality of spaced parallel sound tracks thereon forming a continuous record, a light source, a lens system focussing light therefrom across the entire record area of said film, an aperture plate having a single aperture to pass only the rays which register with a single sound track, means to shift said aperture plate transversely of said film for progressively scanning successive sound tracks, and a member associated with said last mentioned means to indicate the particular track which is being scanned at any position of said aperture plate.

13. In a photographic sound record apparatus for recording on or reproducing from a film having a plurality of spaced parallel sound tracks thereon, a light source, a lens system focussing light therefrom across the entire record area of said film, an aperture plate having a single aperture to pass only the rays which register with a single sound track, a ratchet mechanism to progressively shift said aperture plate transversely of said film for scanning successive sound tracks, film-controlled means actuating said ratchet mechanism at the end of each sound track, and manual means for adjusting said aperture plate to register with any selected sound track, said rays being unobstructed during the shift period whereby a continuous uninterrupted sound record is obtained.

14. In a photographic sound record apparatus for recording on or reproducing from a film having a plurality of spaced parallel sound tracks thereon, a light source, a lens system focussing light therefrom across the entire record area of said film, an aperture plate having an aperture to pass only the rays which register with a single sound track, a ratchet mechanism to progressively shift said aperture plate transversely of said film for scanning successive sound tracks, an electromagnet actuating said ratchet mechanism, a conducting strip on said film spaced from each end of said sound tracks, and means responsive to the influence of said conducting strip to energize said electromagnet when the end of each sound track is reached.

15. In a photographic sound record apparatus for recording on or reproducing from a film having a plurality of spaced parallel sound tracks thereon, a film gate comprising a housing having an annular surface over which the film passes, means focussing a scanning light on said film for scanning a selected sound track, a film-control mechanism, a conducting strip on said film spaced from each end of said sound tracks, and means responsive to the influence of said conducting strip to actuate said film-control mechanism.

16. In a photographic sound record apparatus for recording on or reproducing from a film having a plurality of spaced parallel sound tracks thereon, a film gate comprising a housing having an annular surface over which the film passes, means focussing a scanning light on said film for scanning a selected sound track, a film-control mechanism, an electric control circuit for said film-control mechanism, a conducting strip on said film spaced beyond the ends of said sound tracks, and means responsive to the influence of said conducting strip when said strip is in proximity to said film gate for actuating said control circuit.

17. In a photographic sound record apparatus for recording on or reproducing from a film having a plurality of spaced parallel sound tracks thereon, a film gate comprising a housing having an annular surface over which the film passes, means focussing a scanning light on said film for scanning a selected sound track, film reversing means, means to shift said light for scanning successive sound tracks, an electric control circuit actuating both of said means in synchronism, and a conducting strip on said film adapted to actuate said electric control circuit when said strip is in proximity to said film gate.

18. In a photographic sound record apparatus for recording on or reproducing from a film having a plurality of spaced parallel sound tracks thereon, a film gate comprising a housing having an annular surface over which the film passes, means focussing a scanning light on said film for scanning a selected sound track, film reversing means, means to shift said light for scanning successive sound tracks, an electric control circuit actuating said film reversing means and said light shifting means in synchronism, and a conducting strip on said film adapted to actuate said electric control circuit when said strip makes contact with said film gate.

19. In a photographic sound record apparatus for recording on or reproducing from a film having a plurality of spaced parallel sound tracks thereon, a film gate having an insulated conducting member over which said film passes, means to feed said film over said gate at a uniform speed, means to focus a scanning light on one of said sound tracks, means to reverse the feed of said film, means to shift said scanning light for scanning successive sound tracks, an electric control circuit actuating said film reversing means and said light shifting means in synchronism, a conducting strip on said film spaced from the end of said sound tracks, and means actuated when said strip contacts with said conducting member to energize said control circuit for reversing the film and shifting the scanning light in synchronism.

20. In a photographic sound record apparatus for recording on or reproducing from a film having a plurality of spaced parallel sound tracks thereon, a light source, a lens system focussing light from said source with equal intensity across the entire record area of said film, an aperture plate having an aperture adapted to pass only the rays which register with a single sound track, ratchet mechanism to shift said aperture plate transversely of said film for causing said rays to progressively register with successive sound tracks, said ratchet mechanism comprising a ratchet wheel and pawls cooperating therewith, an arm movable to actuate said pawls, means normally holding said pawls out of engagement with said ratchet wheel, spring means for holding said aperture plate in any selected position, and manual means for shifting said aperture plate when said pawls are in disengaged position.

21. In a photographic sound record apparatus for recording on or reproducing from a film having a plurality of spaced parallel sound tracks thereon, a film gate, means to feed a film thereover at a uniform speed, a light source, a lens system focussing light from said source with equal intensity across the entire record area of the film on said film gate, means supporting said film gate, light source and lens system in fixed position, an aperture plate having an aperture adapted to pass only the rays which register with a single sound track, a pivoted arm to control the direction of feed of said film, electromagnetic means to actuate said pivoted arm, electromagnetic means to shift said aperture plate transversely of said film for causing said rays to progressively register with successive sound tracks, an impulse relay adapted at each actuation to reverse the position of said pivoted arm and to actuate said last-mentioned electromagnetic means for shifting said aperture plate, a space discharge device actuating said impulse relay, means normally supplying a biasing potential to block said space discharge device, and means controlled by the film to change the bias of said space discharge device so as to permit space current to pass for actuating said impulse relay.

22. In a photographic sound record apparatus for recording on or reproducing from a film having a plurality of spaced parallel sound tracks thereon, reversible feed means for said film, scanning means to scan a selected sound track, shifting means to shift said scanning means from one sound track to the next, and control mechanism comprising a electromagnetic means controlling said reversible feed means, additional electromagnetic means controlling said shifting means, a conducting member carried by said film, and means to actuate both of said electromagnetic means when said conducting member reaches a predetermined position in said apparatus.

23. In a photographic sound record apparatus for recording on or reproducing from a film having a plurality of spaced parallel sound tracks thereon, reversible feed means for said film, scanning means to scan a selected sound track, shifting means to shift said scanning means from one sound track to the next, control mechanism comprising electromagnetic means controlling said reversible feed means to reverse the direction of feed of said film, a second electromagnetic means to control said shifting means, film-controlled means actuating both of said electromagnetic means in synchronism for reversing the film and shifting the scanning means at the end of each sound track, means to disconnect said feed means, a high speed rewind mechanism, means to cause actuation thereof for rewinding the film, and means to prevent actuation of said rewind mechanism except when said feed means is disconnected.

24. In a photographic sound record apparatus for recording on or reproducing from a film having a plurality of spaced parallel sound tracks thereon, reversible feed means for said film, scanning means to scan selected sound tracks, shifting means to shift said scanning means from one sound track to the next, and control means comprising an impulse relay adapted at each actuation to reverse said drive means and to actuate said shifting means, a space discharge device adapted to actuate said impulse relay when space current passes therethrough, said space discharge device having a control grid, means normally impressing a biasing potential on said control grid to prevent passage of space current, a conducting guide member supporting said film and connected to said grid, and a conducting strip carried by said film and adapted when in contact with said conducting guide member to change the biasing potential on said grid so as to permit space current to flow.

25. In a photographic sound record apparatus for recording on or reproducing from a film having a plurality of spaced parallel sound tracks thereon, a film gate, a pair of conducting guide members on said film gate having surfaces to support said film in its passage thereover, one of said members being insulated from said film gate, a strip of conducting material on said film adapted to complete the circuit between said members when the end of the sound track is reached, and means responsive to the completion of said circuit to control the operation of said apparatus.

26. In a photographic sound record apparatus for recording on or reproducing from a film having a plurality of spaced parallel sound tracks thereon, reversing feed means for feeding said film at a uniform rate, means to disconnect said feed means, a high speed rewind mechanism, an impulse relay, film controlled means for actuating said relay when the film reaches a predetermined position, and a multiple-position switch connecting said impulse relay when in one position to reverse the direction of feed of said film at each actuation thereof and in another position to automatically disconnect said feed means or to connect said feed means to feed the film in a given direction, and in a third position to alternately disconnect said feed means and to actuate said high speed rewind mechanism.

27. In combination, a film or tape, electrical conducting means carried thereby, feed means for said film or tape, means to control said feed means, a space discharge device for actuating said control means, and means responsive to the influence of said electrical conducting means when said conducting means reaches a given position for causing actuation of said space discharge device.

28. In combination with a reversible feed means for moving a film or tape, a reversing mechanism, a space discharge device actuating said reversing mechanism, means normally supplying a biasing potential to block said space discharge device, and means controlled by the film or tape to change the bias of said space discharge device so as to permit space current to pass for actuating said reversing mechanism.

29. In combination with a feed mechanism for moving a film or tape, a space discharge device controlling said feed mechanism, means normally supplying a predetermined biasing potential to said space discharge device, a control circuit connected to control by its capacity said biasing potential, and means controlled by said film or tape for changing the capacity of said control circuit so as to cause said space discharge device to actuate said feed mechanism.

30. In a photographic sound record apparatus for recording on or reproducing from a film, a film gate having a part cylindrical surface over which said film is passed, an elongated light source cooperating with said film, a single feed sprocket engaging said film on both sides of said film gate to feed the film past said gate in the form of a loop, and reversible driving means for said sprocket.

31. A scanning system for recording sound on a photographic film in a plurality of spaced parallel sound record tracks, which comprises a glow lamp having means to produce a narrow elongated light beam, means to focus said light beam with substantiallly equal intensity across the entire sound area of said film, and an aperture plate adapted to pass a portion of said beam corresponding to a single record track only.

32. A scanning system for recording sound on a photographic film in a plurality of spaced parallel sound record tracks, which comprises a glow lamp having means to produce a narrow elongated light beam, means to focus said light beam with substantially equal intensity across the entire sound area of said film, and an aperture plate adapted to pass a portion of said beam corresponding to a single record track only, said aperture plate being movable to shift the scanning rays from one record track to the next.

33. In a system for scanning a photographic sound record having a plurality of sound record tracks thereon, a scanning lamp having an elongated filament at least as long as the width of the active area of said film, optical means focussing the light from said filament in the form of a narrow beam of uniform intensity across said film, an aperture plate having an aperture adapted to pass only light rays for scanning a single sound record track, said aperture plate being shiftable to shift the scanning ray from one sound record track to the next, and a photoelectric cell positioned to receive the scanning ray as it passes through said film.

34. In a system for scanning a horizontally moving photographic film having a plurality of spaced parallel sound record tracks thereon, an exciter lamp having an elongated vertical filament at least as long as the width of the active area of said film, means holding said filament under tension to compensate for expansion or contraction thereof, a lens assembly for focussing the light from said exciter lamp in the form of a vertical narrow beam extending across the active area of said film, an aperture plate having an aperture to pass rays for scanning a selected sound record track only, said aperture plate being movable vertically across said film to shift said scanning ray between successive sound record tracks, and a photoelectric cell positioned to receive the scanning ray as it passes through said film.

35. In a photographic sound record apparatus for recording on or reproducing from a film having spaced parallel sound tracks thereon which are joined at their ends by sound track loops to form a continuous sound record, a light source, a single aperture, means for focussing a light ray from said source on a single sound record track on said film by means of said aperture, means to shift said ray transversely of said film for causing said ray to register progressively with successive sound tracks, and means causing said ray to follow said loops while shifting from one track to another whereby uninterrupted recording or reproducing is obtained.

36. In a photographic sound record apparatus for recording on or reproducing from a film having spaced parallel sound tracks thereon which are joined at their ends by sound track loops to form a continuous sound record, a light source, means for focussing a light ray from said source on a single sound record track on said film, means to reverse the direction of feed of said film when said ray reaches the end of a record track, and means for shifting said ray transversely of said film in synchronism with said reversing means so as to cause said ray to follow said loops in shifting from one track to the next whereby uninterrupted recording or reproducing is obtained.

37. In a photographic sound record apparatus for recording on or reproducing from a film having spaced parallel sound tracks thereon which are joined at their ends by sound track loops to form a continuous sound record, a light source, means for focussing light from said source with equal intensity across the entire record area of said film, an aperture plate having an aperture arranged to pass to said film only the rays which register with a single sound track, means for reversing said film when said ray reaches the end of a sound track, and means for shifting said aperture plate transversely of said film in synchronism with said reversing means so as to cause said ray to follow said loops in shifting from one sound track to the next whereby continuous recording or reproducing is obtained.

LEONARD A. HERZIG.